(12) United States Patent
Appleyard et al.

(10) Patent No.: US 8,954,922 B2
(45) Date of Patent: *Feb. 10, 2015

(54) SERVICE EMULATOR SUBSTITUTING FOR BACKEND COMPONENTS TO SATISFY NEEDS OF FRONT END COMPONENTS

(75) Inventors: James P. Appleyard, North Richland Hills, TX (US); Edwin J. Bruce, Corinth, TX (US); Romelia H. Flores, Keller, TX (US); Joshua L. Purcell, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/601,212

(22) Filed: Aug. 31, 2012

(65) Prior Publication Data

US 2013/0067428 A1    Mar. 14, 2013

Related U.S. Application Data

(63) Continuation of application No. 11/932,266, filed on Oct. 31, 2007, now Pat. No. 8,296,718.

(51) Int. Cl.
*G06F 9/44*    (2006.01)

(52) U.S. Cl.
CPC ... *G06F 8/20* (2013.01); *G06F 8/10* (2013.01)
USPC ........... 717/102; 717/103; 717/106; 717/108; 717/120

(58) Field of Classification Search
None
See application file for complete search history.

(56) References Cited

U.S. PATENT DOCUMENTS

| 6,854,107 | B2 | 2/2005 | Green et al. | |
|---|---|---|---|---|
| 7,158,940 | B2 | 1/2007 | Cimral et al. | |
| 8,069,435 | B1 * | 11/2011 | Lai | 717/106 |
| 8,161,500 | B2 * | 4/2012 | Tan et al. | 719/330 |
| 2002/0054086 | A1 | 5/2002 | Van Oostenbrugge et al. | |
| 2002/0169852 | A1 | 11/2002 | Schaeck | |
| 2003/0014560 | A1 | 1/2003 | Mugica et al. | |
| 2003/0107596 | A1 | 6/2003 | Jameson | |
| 2004/0001565 | A1 | 1/2004 | Jones et al. | |
| 2004/0090969 | A1 | 5/2004 | Jerrard-Dunne et al. | |
| 2004/0093381 | A1 * | 5/2004 | Hodges et al. | 709/204 |
| 2004/0183831 | A1 | 9/2004 | Ritchy et al. | |
| 2004/0225955 | A1 | 11/2004 | Ly | |
| 2004/0249664 | A1 | 12/2004 | Broverman et al. | |
| 2005/0125772 | A1 | 6/2005 | Kohno | |
| 2005/0154701 | A1 | 7/2005 | Parunak et al. | |

(Continued)

OTHER PUBLICATIONS

Suri, J., et al., "Building Mashup Portlets," Sun Microsystems, Aug. 24, 2006.

(Continued)

*Primary Examiner* — Isaac T Tecklu
(74) *Attorney, Agent, or Firm* — Patents on Demand P.A.; Brian K. Buchheit; Scott M. Garrett

(57) ABSTRACT

Interface requirements for a set of services to be implemented between service oriented architecture (SOA) front end components and SOA back end components can be identified. A service emulator can be created that satisfies service call and data needs of the SOA front end components. The SOA front end components are operable to be combined with the service emulator to form an interactive prototype. The SOA front end components are operable to be combined with the SOA back end components to form an operable SOA solution.

25 Claims, 5 Drawing Sheets

(56) References Cited

U.S. PATENT DOCUMENTS

| | | |
|---|---|---|
| 2005/0267789 A1 | 12/2005 | Satyadas et al. |
| 2006/0010195 A1* | 1/2006 | Mamou et al. ............... 709/203 |
| 2006/0184883 A1 | 8/2006 | Jerrard-Dunne et al. |
| 2006/0235733 A1* | 10/2006 | Marks ............................... 705/7 |
| 2007/0011126 A1 | 1/2007 | Conner et al. |
| 2007/0100790 A1* | 5/2007 | Cheyer et al. ..................... 707/1 |
| 2007/0130561 A1 | 6/2007 | Siddaramappa et al. |
| 2007/0168926 A1* | 7/2007 | Rajah et al. ................... 717/104 |
| 2007/0169016 A1 | 7/2007 | Aakolk et al. |
| 2007/0198312 A1 | 8/2007 | Bagchi et al. |
| 2007/0203740 A1* | 8/2007 | Abu El Ata et al. .............. 705/1 |
| 2007/0203766 A1 | 8/2007 | Adler et al. |
| 2008/0086541 A1 | 4/2008 | Simpson et al. |
| 2008/0120129 A1 | 5/2008 | Seubert et al. |
| 2008/0127047 A1 | 5/2008 | Zhang et al. |
| 2008/0209392 A1* | 8/2008 | Able et al. ..................... 717/105 |
| 2008/0285481 A1 | 11/2008 | Hao et al. |
| 2009/0089039 A1* | 4/2009 | Shufer et al. .................... 703/23 |
| 2009/0089078 A1 | 4/2009 | Bursey |
| 2009/0099855 A1 | 4/2009 | Narendra et al. |
| 2009/0112646 A1 | 4/2009 | Bruce et al. |
| 2009/0157419 A1 | 6/2009 | Bursey |

OTHER PUBLICATIONS

"A Primer on Enterprise Mashups: Productivity Drivers for the Web 2.0 Application Style," Kapow Technologies, 2007.

Chen, I.Y., et al., "An SOA-based software deployment management system," 2006 IEEE/WIC/ACM Int'l Conf. on Web Intelligence, 2006.

"Interface for Creating Custom, End-User, Role Based Application Interface", Disclosure No. IPCOM13828D, IBM Corporation, Oct. 2000.

"SOA Workplace Portal: Emissions Dashboard", IBM Corp., Nov. 11, 2006.

* cited by examiner

SERVICE EMULATOR SUBSTITUTING FOR BACKEND COMPONENTS TO SATISFY NEEDS OF FRONT END COMPONENTS

CROSS-REFERENCE TO RELATED APPLICATIONS

This application is a continuation of U.S. patent application Ser. No. 11/932,266, filed Oct. 31, 2007 (pending), which is incorporated herein in its entirety.

BACKGROUND

The present invention relates to the field of services oriented architecture (SOA) technologies and, more particularly, to SOA software components that endure from prototyping to production.

A SOA produces software implemented business solutions that consist of a set of loosely coupled, black-box software components interoperating to deliver well defined levels of services. That is, services in a SOA serve as an abstraction layer that hide core system implementation from clients and provide a simple loosely coupled way to integrate both service consumer and provider. The coupling is based upon simple XML based messages and open standards that describe the protocol for service discovery and invocation (e.g., UDDI, WSDL, and SOAP). Each interaction among SOA software components is independent of each and every other interaction and the interconnect protocols of the communicating devices upon which the SOA software components execute.

One of the more significant strengths of a SOA architecture is its flexibility and robustness. Software components written in any language, targeted for any platform, and/or adhering to any design methodology can be adapted to conform to SOA requirements, thus becoming SOA components able to be integrated within a SOA solution. For example, legacy code can be "SOA wrapped" and changed into SOA components, which can interact with other software components of a SOA solution. Thus, SOA solutions permit a strong leveraging of existing IT assets. This flexibility is a direct offshoot of the SOA abstraction principle, where underlying implementation specifics of software components are abstracted from other software components.

Poorly designed SOA solutions, like any poorly designed software solution, can result in poor performance, high maintenance costs, upgrade difficulties, and a low quality user experience. These problems are not inherent in a SOA solution, but instead to software solutions in general. In other words, re-packing otherwise inadequate code into SOA components to form an "integrated" SOA solution will result in an inadequate solution. An SOA implementation does not fix underlying flaws with implementation; it instead provides a cohesive framework for permitting loosely coupled software components, which can be distributed across any computing space, to interact using standard communication protocols. Like any other software solution, disciplined adherence to well defined and well documented models, standards, and design principles, produces sound results, while ignoring basic software design principles can result in problematic code.

A SOA development effort can involve software prototyping. Software prototyping can be defined traditionally as a process of creating an incomplete model of a future full featured software program. Advantages of prototyping can include: early evaluation, obtaining feedback early in a development project; being able to determine earlier if proposed software matches a software specification; and providing some insights early on as to whether project timelines and milestones are reasonably likely to be met. Disadvantages of prototyping can include: encouraging development of software with insufficient analysis; user confusion between prototypes and finished system implementations which can result in unrealistic time expectations; extensive development time for a prototype; and an expense of implementing a prototype. Details of the advantages and disadvantages can vary based upon a type of prototyping used, which can include throwaway or rapid prototyping, evolutionary prototyping, incremental prototyping, and the like.

BRIEF SUMMARY

One aspect of the disclosure is for a method, computer program product, and/or system within which interface requirements for a set of services to be implemented between service oriented architecture (SOA) front end components and SOA back end components are identified. A service emulator is created that satisfies service call and data needs of the SOA front end components. The SOA front end components are operable to be combined with the service emulator to form an interactive prototype. The SOA front end components are operable to be combined with the SOA back end components to form an operable SOA solution.

One aspect of the disclosure is for a method, computer program product, and/or system within which a service emulator is bound to service oriented architecture (SOA) front end components of a SOA solution to create an interactive prototype for the SOA solution. The SOA front end components provide the user experience for the SOA solution. The SOA solution comprises SOA backend components that are loosely coupled to the SOA front end components. The interactive prototype is executed by a computer to provide the user experience of the SOA solution without any of the SOA backend components executing. During execution of the interactive prototype, the service emulator satisfies service call and data needs of the SOA front end components.

One aspect of the disclosure is for a system and/or computer program product having one or more memories and program instructions stored in the one or more memories. A service emulator can include at least a subset of the program instructions. The service emulator can satisfy service call and data needs of a set of service oriented architecture SOA front end components. The SOA front end components and the service emulator together form an executable, interactive prototype of a SOA solution. The SOA front end components comprise client facing components providing a user experience for the SOA solution. The SOA front end components and a set of SOA back end components together form the SOA solution.

DETAILED DESCRIPTION

Figure 1:
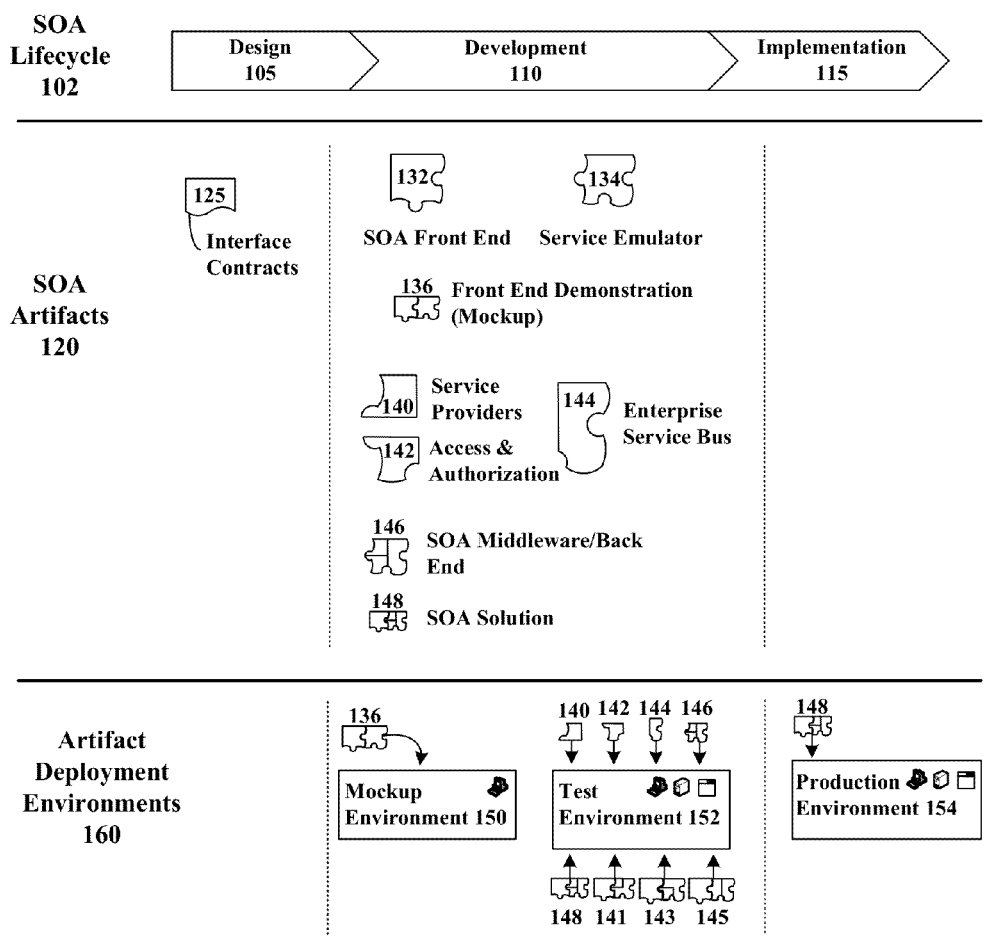
FIG. 1 is a diagram showing a service oriented architecture (SOA) having front end SOA components realized early within and applicable to all phases of a SOA lifecycle, which includes design, development, and implementation phases.

Unlike previous teachings, the invention discloses a multi-phased approach for a SOA development effort, where SOA components are designed to remain fundamentally unchanged from one phase to the next, which includes from a prototyping phase, to a design phase, to a test phase, to a deployment phase. This approach is believed to maximize the benefits of prototyping, while minimizing or even eliminating the disadvantages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram 100 showing a service oriented architecture (SOA) having front end 132 components realized early within and applicable to all phases of a SOA lifecycle 102, which includes design 105, development 110, and implementation 115 phases. Creation of enduring SOA front end 132 components can require a level of foreknowledge of the detailed workings of final SOA solution 148 within which the front end 132 will be used. The SOA front end 132 components can be client-facing software components that are responsible for providing a user experience. The user experience can be provided through a Web browser, a Rich Internet Interface, or any other user-interactive interface. A design artifact 120 referred to as an interface contract document 125 can specify requirements for implementing a front end 132.

To create the interface contract document 125, a set of real and/or envisioned services to be provided from the SOA back end 140-146 should be identified. A sufficient number of services should be identified at this stage to ensure that no major design changes will be required from the SOA front end 132, when integrating the front end 132 in a final SOA solution 148. Document 125 is effectively a contract, which ensures that if a front end 132 is designed in accordance with the interface requirements specified within, that the interface will operate within and satisfy user interaction requirements of the solution 148. The solution 148 is to be deployed within a production environment 154 during an implementation phase 115 of the lifecycle 102. Other components of diagram 100 must adhere to the interface requirements of document 125, as well.

Once interface contract document 125 has been specified, the SOA front end 132 development can proceed independent of the development of a SOA middleware/back end portion of the SOA solution 148. Typically, the front end 132 can be designed before the middleware/back end 140-146, since this permits a prototype or mockup based upon the front end 132 to be created and evaluated. More specifically, the front end 132 can be combined with a service emulator 134 to create a front end demonstration or mockup 136 (e.g., working prototype) able to be deployed in a mockup environment 150. The service emulator 134 can satisfy the service and data needs of front end 132.

In one arrangement, the mockup environment 150 can be implemented within a single computing system, such as a notebook computer. This arrangement enables the mockup 136 to be a stand-alone, portable product, which can be used for demonstration and marketing purposes, even when network connectively is not available. In one embodiment, the mockup 136 can be contained within a virtual machine (e.g., VMware Virtual Machine, for example), which can be played on any client having a compatible virtual machine hosting software. The invention is not limited in this regard, however, and the front end 132 can be implemented upon a different computing device than emulator 134 to create a mockup 136 distributed across a network space.

During a testing phase involving test environment 152, the front end 132 can be executed with combinations 141, 143, 145 of emulated backend components and developmental middleware/back end components 140, 142, 144. The individual components 140, 142, 144 can also be separately tested in environment 152.

After all components 140-144 have been developed and tested, a full SOA solution 148 can be deployed to a production environment 154. Even after deployment, the mockup 136 can be advantageously used in a stand-alone fashion by marketing personnel, for demonstrations, and the like.

Figure 2:
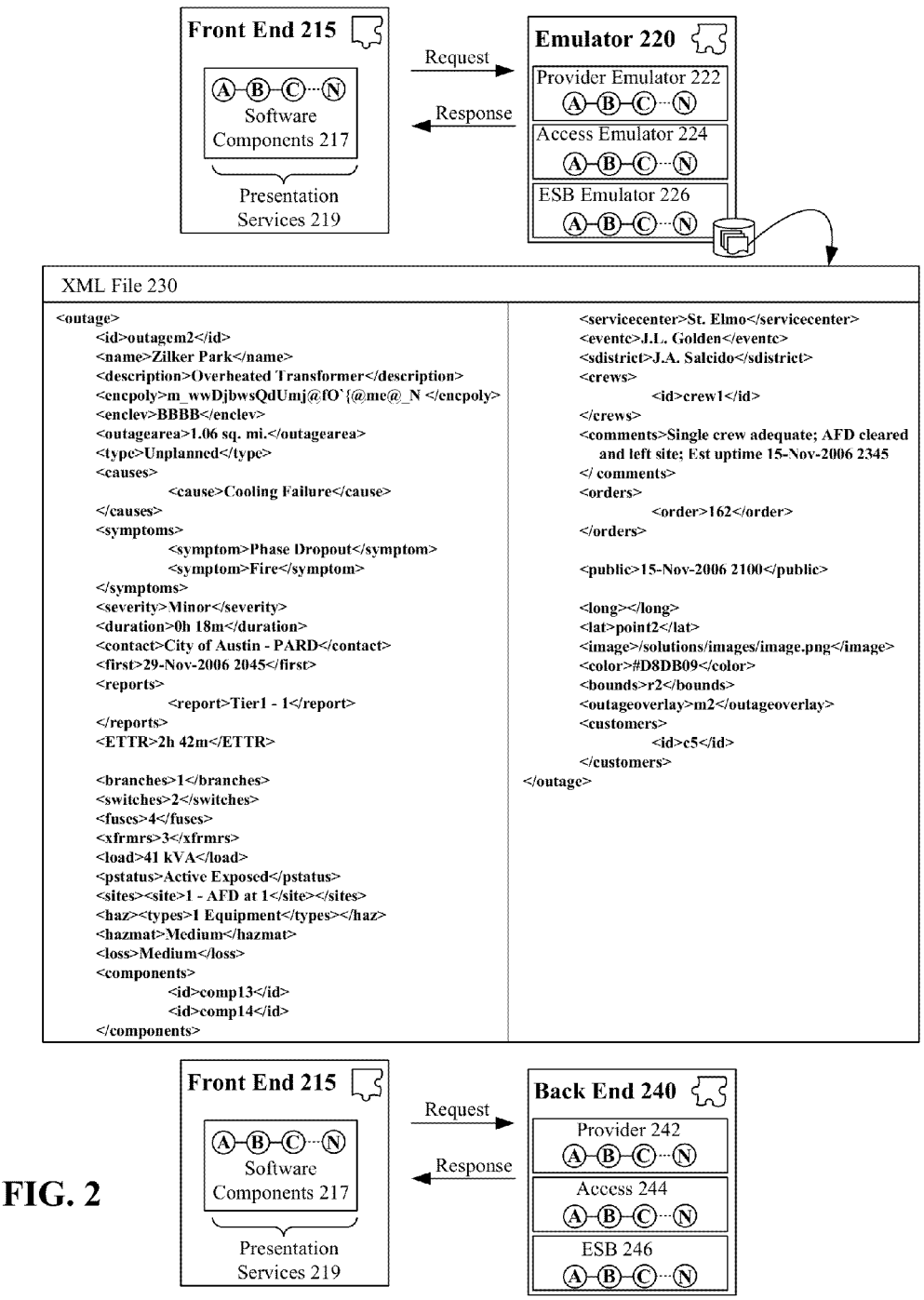
FIG. 2 is a schematic diagram illustrating a front end for a SOA solution, which is able to be utilized in a substantially unchanged manner throughout a SOA lifecycle in accordance with an embodiment of the inventive arrangements disclosed herein.

FIG. 2 is a schematic diagram illustrating a front end 215 for a SOA solution, which is able to be utilized in a substantially unchanged manner throughout a SOA lifecycle in accordance with an embodiment of the inventive arrangements disclosed herein. The front end 215 can include a number of SOA based software components 217, which interact with each other and with other SOA solution components through SOA compliant interfaces. The components 217 can provide presentation services 219 for client-side interactions. The front end 215 effectively controls a user's experience with a SOA solution.

Early in a development process, the front end 215 can be paired with an emulator 220, which interacts with the front end 215 providing services and data in exactly the same manner as a SOA back end 240 does later in the development cycle. At a time the emulator 220 is used, the back end 240 components need not be implemented. Additionally, the emulator 220 can be locally implemented to create a stand-alone and portable SOA solution, which can be presented as a prototype during demonstrations and marketing engagements. Unlike traditional prototypes, which are generally discarded during the design process and/or which are significantly modified during a lifecycle, the prototype formed from front end 215 and emulator 220 provides a user experience substantially identical to that which will be provided by the final SOA solution—formed by the same, unmodified front end 215 and back end 240.

Emulator 220 can utilize a series of files or data stores, such as file 230, when interacting with the front end 215. These files can be coded against the interface contracts, such as contract 125, upon which the front end 215 was designed. The files 230 provided by the emulator 220 should be identical in nature to those provided by the back end 240.

Figure 4:
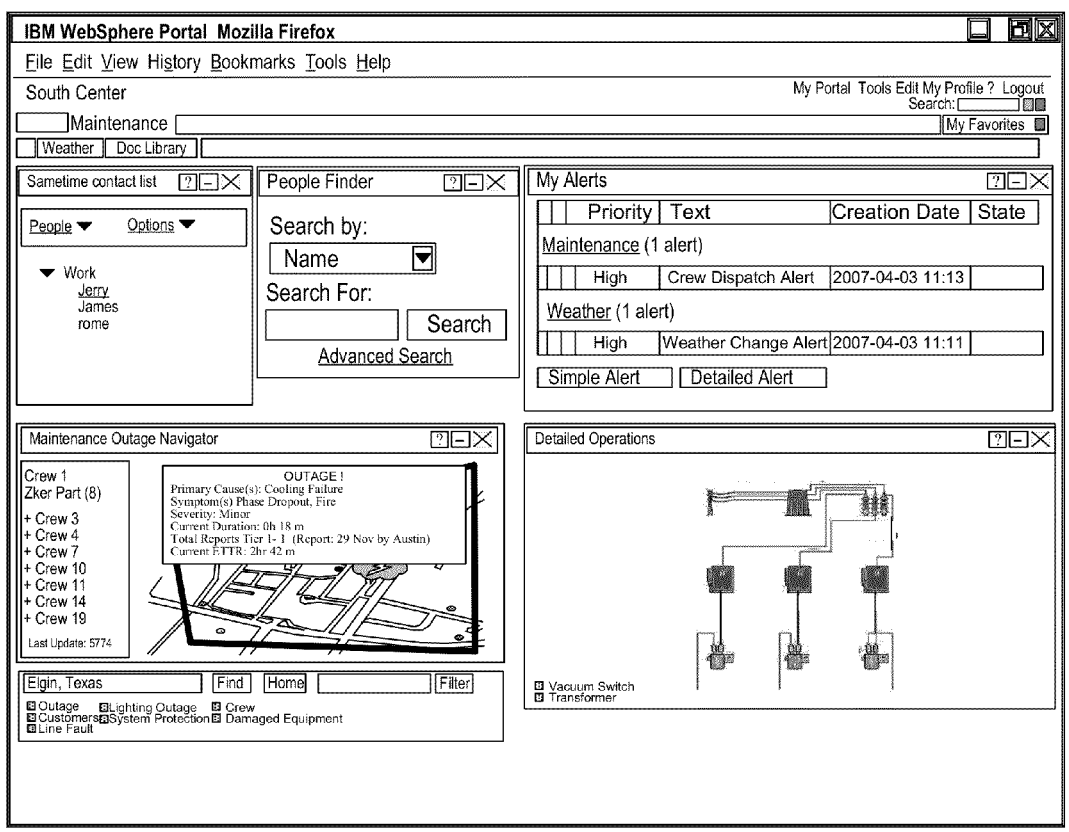
FIG. 4 is a sample graphical user interface, which can result from an execution of a fully functional SOA front end.

As shown, file 230 represents an XML file for a portal mashup, which federates data from multiple sources. Specifically, the portal mashup can be an electric distribution system (e.g., a local utility) "outage" portal, as shown in FIG. 4. The outage portal can track trouble spots, their causes, failure systems, responses (e.g., personnel and equipment) and overall system health. The back end 240 for the utility outage portal can require an integration of services from several back end systems, each of which deal with various topographies (e.g., power load flow, equipment testing, crew skills and deployment, parts and logistics, etc.).

In one optional arrangement, the emulator 220 can be constructed in a modular fashion. Each modular unit of emulator 220 can, for example, be a set of one or more SOA components 222-226. As shown, emulator 220 can include a back end service provider emulator component 222, an access and authorization emulator component 224, and an enterprise service bus component 226. Each of these components 222-226 can correspond to an equivalent back end 240 component 242-246, which is being emulated. Different files 230 can be associated with the different components 222-226. Use of modular emulation components 222-226 can permit a user/designer to emulate back end services at different component levels, which can be useful during development and testing. For example, when service provider components 242 are completed, but access and authorization components 244 are not, a testing system can use the front end 215, the provider component 242, and the access emulator 224 and ESB 226 emulator components to produce an apparently fully functional solution. When other back end components 244-246 are completed, they can be used instead of their emulation equivalents 224-226.

Figure 3:
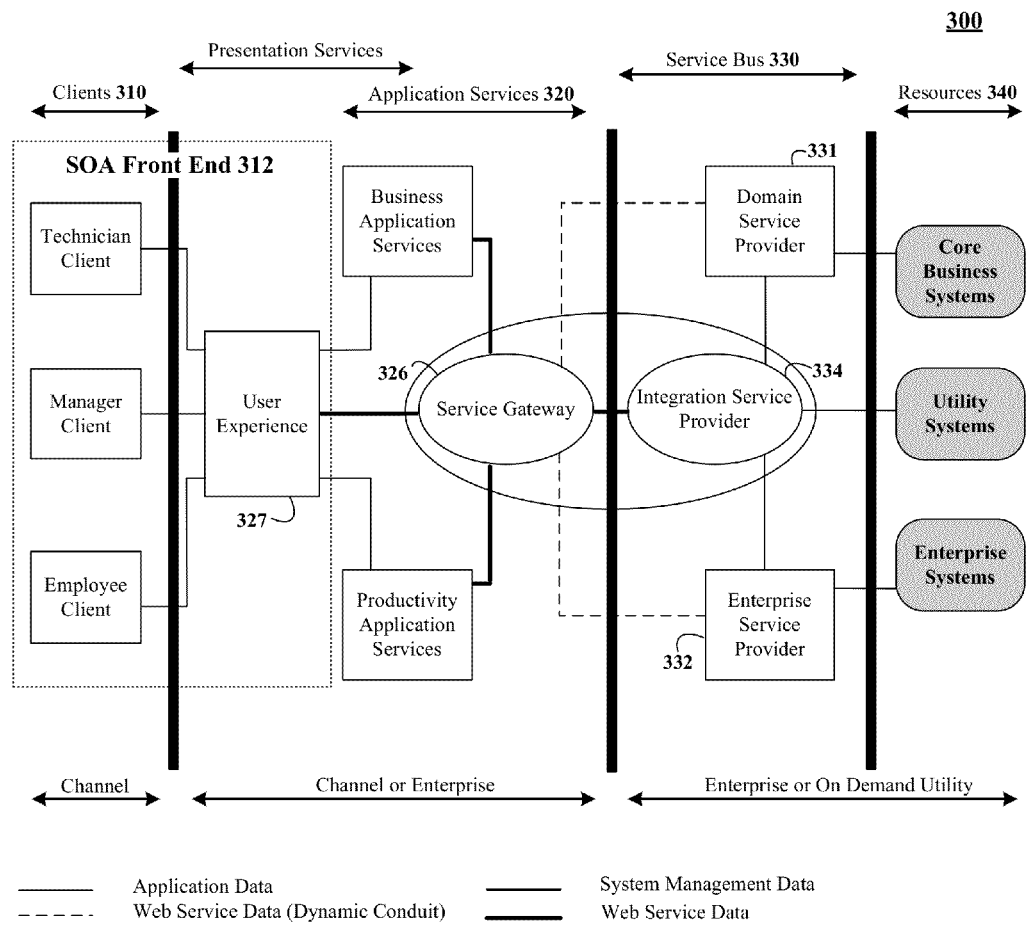
FIG. 3 is a schematic diagram of a SOA implementation, where one or more SOA components endure throughout a SOA lifecycle in accordance with an embodiment of the inventive arrangements disclosed herein.

FIG. 3 is a schematic diagram of a service oriented architecture (SOA) 300 implementation, where one or more SOA component endure throughout a SOA lifecycle in accordance with an embodiment of the inventive arrangements disclosed herein. As shown by SOA 300, the loosely coupled nature is advantageous in connecting back end resources 340 via a service bus 330 to a service gateway 326 for use by a portal server 327. The SOA 300 environment can also make customizing user experiences for different clients 310 easier than would be possible with a more rigid architecture.

As shown, for example, a portal workplace and its portlets can map to layer 310 of the SOA 300. Multiple user roles and their associated Web browsers can access the presentation and application services 320. The presentation and application services 320 can include the user experience portal server 327 and various support applications, such as an organization directory, instant messaging, and content management (library) systems. The SOA front end 312 includes both a layer of the SOA that provides a user experience to clients, as well as the client layer 310.

Various back end resources 330-340 can yield data to be used directly or to-be-federated data. Resource 340 contributions must be fetched, coordinated, and appropriately transformed. The use of domain 331 and enterprise 332 service providers allows the isolation and insulation of back end systems, while allowing access to their functions via Web Services interfaces. The integration service provider 334 can integrate information from the other service providers 331, 332 and can communicate with a service gateway 326. The service gateway 326 can implement dynamic binding, request/response decomposition/composition, and content-based routing of document-literal Extensible Markup Language (XML) requests generally arriving via Web Services, and provide protocol conversion if necessary.

It should be emphasized that the architecture 300 is shown for illustrative purposes only and that the scope of the invention is not to be limited in this regard. For instance, other SOA architectures not having an integration service provider 334 component can be used.

FIG. 4 is a sample graphical user interface (GUI) 400, which can result from an execution of a fully functional SOA front end. The interface 400 provided when the SOA front end is integrated to a service emulator can be substantially identical (other than potential differences between sample and real data) to an interface 400 provided when the SOA front end is integrated as part of a SOA solution.

Details illustrated in GUI 400 are specifically tailored to represent a possible outage mockup, which uses XML flat file 230 illustrated in FIG. 2. All icon positioning and associated data in the "mashup" shown in interface 400 can be driven by a set of XML files, including file 230. The business logic within the portal server code and pages can represent exactly that to be used in a full SOA implementation. Only the access mechanism for data differs, which comes from outside the user interface layer.

Figure 5:
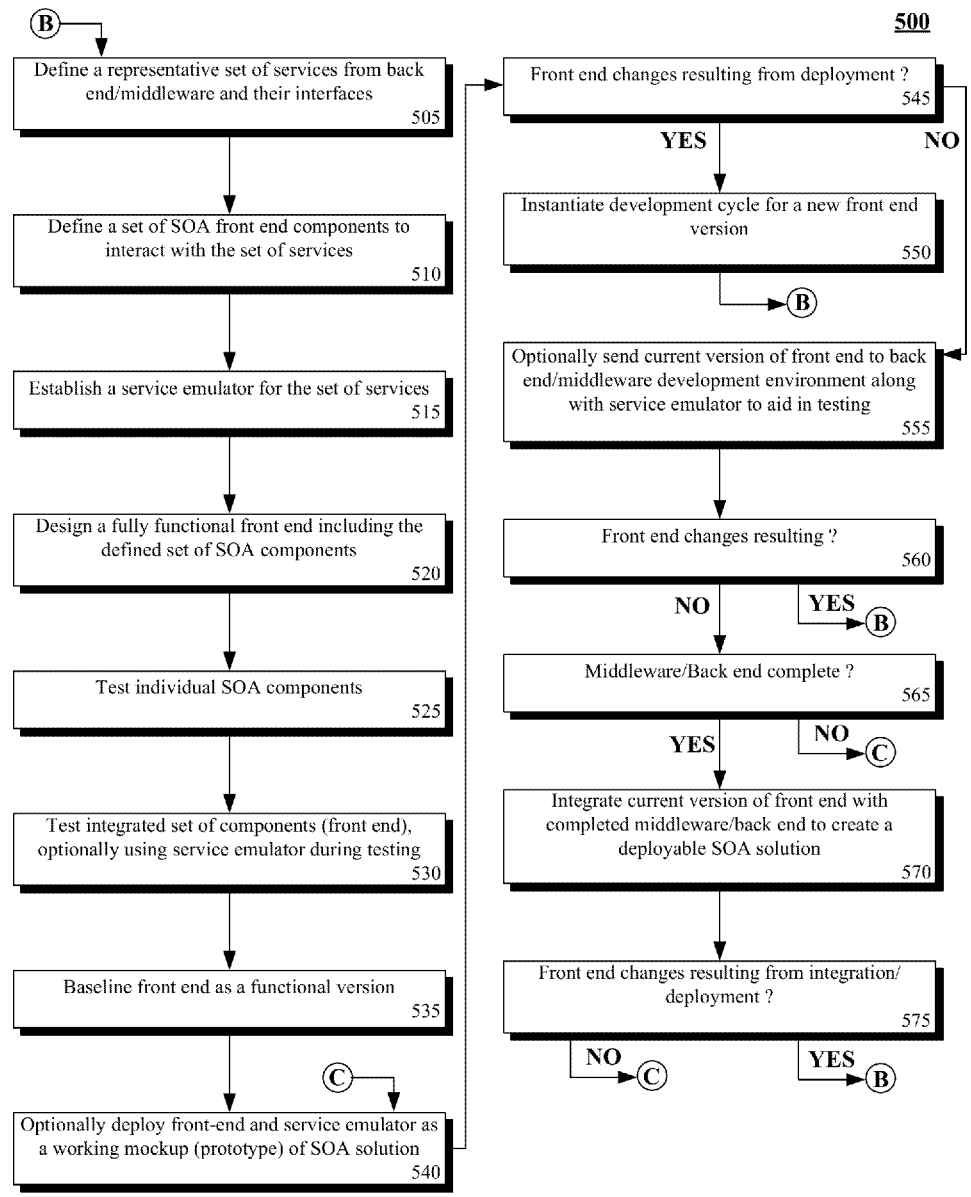
FIG. 5 is a flow chart of a method for creating fully functional SOA front end components, which can used in an essentially unchanged fashion across multiple stages of a SOA lifecycle in accordance with an embodiment of the inventive arrangements disclosed herein.

FIG. 5 is a flow chart of a method 500 for creating fully functional SOA front end, which can used in an essentially unchanged fashion across multiple stages of a SOA lifecycle in accordance with an embodiment of the inventive arrangements disclosed herein. Essentially unchanging recognizes that any fully functioning software artifact, such as the SOA front end described herein, can naturally evolve or change over time. A common mechanism to control this evolution is to baseline different versions of a software product, where a set of iterative improvement or changes are incorporated in later versions. Because the SOA front end implemented herein can be a fully functional product able to be used for prototyping purposes, for testing of other SOA components, and/or for deployment purposes, it can be versioned in a manner independent of other SOA components.

Method 500 can begin in step 505, where a representative set of services from a back end/middleware portion of a SOA project can be defined along with a set of interfaces for exchanging content. In step 510, a set of SOA front end components can be modeled/defined in a manner so that these components are able to interface with the services defined in step 505. In step 515, a service emulator for the set of services can be established. A fully functioning front end that includes the defined/modeled set of SOA front end components can be designed and coded in step 520. Individual ones of these front end SOA components can be tested (step 525) before an integration test of all front end components is conducted in step 530. Once testing is successfully completed, the SOA front end solution can be baselined as a functional version, as shown by step 535. Once baselined, the front end and service emulator can be optionally deployed as a working mockup or prototype of the SOA solution, as shown by step 540. Feedback can result from use of the prototype in step 545, which can initiate a development cycle based upon these changes for a new version of the SOA front end, which is indicated by step 550. A new development cycle can repeat the previous design steps, which is shown by the method proceeding from step 550 to step 505, where feedback induced changes can be incorporated within a design process.

When no changes are to be implemented in step 545, the method can proceed to step 555, where a current version of the front end can be optionally used by designers/developers of back end components. Use of a fully functional front end can, in certain situations, make testing one or more SOA back end or middleware components easier. Additionally, the service emulator that operates with the front end can be designed in a modular fashion so that individual service components or sets of components simulated by the emulator can be replaced with under development/under test SOA back end/middleware components. In other words, use of the modular emulator can permit a user to isolate behavior differences during testing to a developer determined set of SOA components. In step 560, use of the front end during testing can result in feedback for improvements/changes to the front end components. These changes can result in new version of the front end being developed, shown by the method path from step 560 to step 505.

Otherwise, a determination can be made as to whether middleware/back end SOA components have been completed. In not, a current version of the front end can continue to be used for prototyping, testing other portions of the SOA system, and the like, shown by proceeding in the method from step 565 to step 540. Once the remaining components of the SOA solution are complete, the method can proceed from step 565 to step 570, where a current version of the front end can be integrated with a completed version of the middleware/back end to create a deployable SOA solution. Step 575 shows that front end changes can result from integration/deployment with the other SOA components, which can cause a new version design effort for the front end to initiate, shown by proceeding from step 575 to step 505. When no deployment driven front end changes are indicated, other uses of the front end can continue, which can result in improvements incorporated in subsequent versions, shown by selectively proceeding from step 575 to step 540.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
  at least one computing device identifying interface requirements for a set of services to be implemented between service oriented architecture (SOA) front end components and SOA back end components; and the at least one computing device creating a service emulator that satisfies service call and data needs of the SOA front end components, wherein the SOA front end components are operable to be combined with the service emulator to form an interactive prototype, and wherein the SOA front end components are operable to be combined with the SOA back end components to form an operable SOA solution.

2. The method of claim 1, further comprising:
creating at least one file or data store based upon the interface requirements for the service emulator, wherein said file or data store provides one or more responses to requests issued from the SOA front end components for the interactive prototype.

3. The method of claim 1, wherein the service emulator uses at least one file or data store that comprises data configured to be representative of results achieved when using the SOA back end components to federate data from a plurality of back end sources.

4. The method of claim 1, wherein the interactive prototype is operable for demonstrating user-facing behavior of the operable SOA solution before the SOA back end components are completed.

5. The method of claim 1, further comprising:
soliciting feedback from users of the interactive prototype before said set of SOA back end components are completed.

6. The method of claim 1, further comprising:
modifying user experience features of said SOA front end based upon feedback provided in response to interacting with the interactive prototype without affecting interactions between said SOA front end components and said SOA back end components, and without affecting the identified interface requirements between the SOA front end components and the SOA back end components.

7. The method of claim 1, further comprising:
after creation of the interactive prototype, establishing a version for the SOA front end; and
conducting development efforts that increase an associated version of the SOA front end independent of activities relating to the SOA back end components, while maintaining the interface requirements in a substantially unchanged manner.

8. The method of claim 1, wherein the SOA front end components comprise client facing components providing a user experience for the SOA solution, wherein the SOA back end components comprise back end and middleware services for the SOA solution.

9. A computer program product comprising:
one or more non-transitory computer-readable, storage devices;
program instructions, stored on at least one of the one or more storage devices, to identify interface requirements for a set of services to be implemented between service oriented architecture (SOA) front end components and SOA back end components; and
program instructions, stored on at least one of the one or more storage devices, to create a service emulator that satisfies service call and data needs of the SOA front end components, wherein the SOA front end components are operable to be combined with the service emulator to form an interactive prototype, and wherein the SOA front end components are operable to be combined with the SOA back end components to form an operable SOA solution.

10. The computer program product of claim 9, wherein the interactive prototype is operable for demonstrating user-facing behavior of the operable SOA solution before the SOA back end components are completed.

11. The computer program product of claim 9, wherein the SOA front end components comprise client facing components providing a user experience for the SOA solution, wherein the SOA back end components comprise back end and middleware services for the SOA solution.

12. A method comprising:
a computer binding a service emulator to service oriented architecture (SOA) front end components of a SOA solution to create an interactive prototype for the SOA solution, wherein the SOA front end components provide user experience for the SOA solution, wherein the SOA solution comprises SOA backend components; and
the computer executing the interactive prototype to provide the user experience of the SOA solution without any of the SOA backend components executing, wherein during execution of the interactive prototype the service emulator satisfies service call and data needs of the SOA front end components.

13. The method of claim 12, further comprising:
identifying a set of interface requirements for a set of services loosely coupling the SOA front end components to the SOA backend components, wherein the service emulator conforms to the interface requirements.

14. The method of claim 12, wherein the interactive prototype is operable for demonstrating user-facing behavior of the operable SOA solution before the SOA back end components are completed.

15. The method of claim 12, wherein the service emulator permits the SOA front end components to be developed and tested independent of the SOA back end components under a condition that the interface requirements are not substantially modified.

16. The method of claim 12, wherein the service emulator uses at least one file or data store that comprises data configured to be representative of results achieved when using the SOA back end components to federate data from a plurality of back end sources.

17. A computer program product comprising:
one or more non-transitory computer-readable, storage devices;
program instructions, stored on at least one of the one or more storage devices, to bind a service emulator to service oriented architecture (SOA) front end components of a SOA solution to create an interactive prototype for the SOA solution, wherein the SOA front end components provide user experience for the SOA solution, wherein the SOA solution comprises SOA backend components; and
program instructions, stored on at least one of the one or more storage devices, to execute the interactive prototype to provide the user experience of the SOA solution without any of the SOA backend components executing, wherein during execution of the interactive prototype the service emulator satisfies service call and data needs of the SOA front end components.

18. The computer program product of claim 17, wherein the service emulator permits the SOA front end components to be developed and tested independent of the SOA back end components under a condition that the interface requirements are not substantially modified.

19. The computer program product of claim 17, wherein the service emulator uses at least one file or data store that comprises data configured to be representative of results achieved when using the SOA back end components to federate data from a plurality of back end sources.

20. A computer program product comprising:
- one or more memories, each of which are non-transitory computer readable mediums;
- program instructions stored in the one or more memories;
- a service emulator comprised of at least a subset of the program instructions that responsive to being executed by one or more processors are operable to satisfy service call and data needs of a set of service oriented architecture SOA front end components, wherein the SOA front end components and the service emulator together form an executable, interactive prototype of a SOA solution, wherein the SOA front end components comprise client facing components providing a user experience for the SOA solution, wherein the SOA front end components and a set of SOA back end components together form the SOA solution.

21. The computer program product of claim 20, further comprising:
- an interface contract document stored in at least one of the one or more memories, wherein the interface contract document defines interactions to occur between the SOA front end and services provided by the SOA back end, wherein the service emulator and the SOA front end are coded to conform to interface standards specified by the interface contract document.

22. The computer program product of claim 20, wherein the interactive prototype is executable upon a computing device in a stand-alone fashion without reliance on access to any of the SOA backend components.

23. The computer program product of claim 20, wherein the service emulator utilizes at least one XML file to emulate output that would otherwise be provided by the SOA back end components to SOA front end components.

24. The computer program product of claim 20, wherein said SOA front end provides an interface renderable in a Web browser.

25. The computer program product of claim 20, wherein the SOA front end provides a Web portal renderable in the Web browser.

* * * * *